(12) United States Patent
Hill (10) Patent No.: US 7,852,605 B2
(45) Date of Patent: Dec. 14, 2010

(54) ARC-FLASH HAZARD PROTECTION SYSTEM FOR THREE-PHASE ELECTRICAL DISTRIBUTION SYSTEM

(75) Inventor: Jeffrey J. Hill, Neenah, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 378 days.

(21) Appl. No.: 12/214,801

(22) Filed: Jun. 20, 2008

(65) Prior Publication Data

US 2009/0316310 A1 Dec. 24, 2009

(51) Int. Cl.
  *H02H 3/00* (2006.01)
(52) U.S. Cl. ............................................. 361/2; 361/62
(58) Field of Classification Search ...................... 361/2, 361/4, 62; 218/134, 149
  See application file for complete search history.

(56) References Cited

U.S. PATENT DOCUMENTS 4,933,802 A * 6/1990 Haginoya et al. ............. 361/48
7,180,300 B2 * 2/2007 Premerlani et al. .......... 324/512

* cited by examiner

*Primary Examiner*—Danny Nguyen
(74) *Attorney, Agent, or Firm*—Laura L. Bozek (57) ABSTRACT

An arc-flash hazard protection system for a three-phase electrical distribution system having a plurality of switchgear interconnected with a plurality of distribution buses is disclosed. The protection system includes a plurality of first and second current transformers in signal communication with respective first and second phases of each of the plurality of switchgear, and a bus differential relay connected to receive output signals from each of the first and second current transformers of each of the plurality of switchgear to establish a bus differential protection scheme utilizing only two of the three available phases for each of the plurality of switchgear. The bus differential relay includes a processor responsive to computer executable code when executed thereon to provide a relay trip output signal to each of the plurality of switchgear in response to the bus differential protection scheme of the respective switchgear indicating an imbalanced three-phase current distribution threat indicative of an arc-flash condition.

13 Claims, 10 Drawing Sheets

ARC-FLASH HAZARD PROTECTION SYSTEM FOR THREE-PHASE ELECTRICAL DISTRIBUTION SYSTEM

BACKGROUND OF THE INVENTION

The present disclosure relates generally to arc-flash hazard protection systems, and particularly to arc-flash hazard protection systems for medium-voltage three-phase electrical distribution systems.

Three-phase electrical distribution systems are typically classified as high, medium, and low-voltage systems, with nominal operating voltages being on the order of: greater than 50 kilo-Volt (kV) (high-voltage); less than 50 kV and greater than 1 kV (medium-voltage); and, less than 1 kV (low-voltage), for example. Medium-voltage distribution systems in a processing facility, such as but not limited to a paper mill for example, may utilize distribution buses and switchgear that operate at nominal voltages such as 13.8 kV and 4.2 kV, where the switchgear would be rated for 15 kV and 5 kV, respectively. Many such existing facilities have an already established electrical distribution system that includes many miles of copper bus and a plethora of step-down transformers, switchgear, and the like, which can result in costly expenditures where expansions or upgrades are needed. In the 2004 edition of NFPA-70E (National Fire Protection Association, standard 70E), which is the NFPA standard that addresses electrical safety requirements for employee workplaces, a new arc-flash hazard (AFH) protection requirement was established, which prompted existing facilities to assess whether system upgrades were needed.

In view of standards changes, there is a need in the field of existing electrical distribution systems to provide for arc-flash hazard protection while utilizing much of the already existing electrical distribution infrastructure.

BRIEF DESCRIPTION OF THE INVENTION

An embodiment of the invention includes an arc-flash hazard protection system for a three-phase electrical distribution system having a plurality of switchgear interconnected with a plurality of distribution buses. The protection system includes a plurality of first and second current transformers in signal communication with respective first and second phases of each of the plurality of switchgear, and a bus differential relay connected to receive output signals from each of the first and second current transformers of each of the plurality of switchgear to establish a bus differential protection scheme utilizing only two of the three available phases for each of the plurality of switchgear. The bus differential relay includes a processor responsive to computer executable code when executed thereon to provide a relay trip output signal to each of the plurality of switchgear in response to the bus differential protection scheme of the respective switchgear indicating an imbalanced three-phase current distribution thereat indicative of an arc-flash condition.

Another embodiment of the invention includes an arc-flash hazard protection system for a three-phase electrical distribution system having a plurality of switchgear interconnected with a plurality of distribution buses. The protection system includes a plurality of first and second current transformers in signal communication with respective first and second phases of each of the plurality of switchgear, a first bus differential relay connected to receive output signals from each of the first current transformers of each of the plurality of switchgear, and a second bus differential relay connected to receive output signals from each of the second current transformers of each of the plurality of switchgear. The plurality of switchgear is equal to or less than eighteen circuit breakers, that is, up to eighteen circuit breakers, and each bus differential relay is connected to receive up to eighteen current transformer output signals from the up to eighteen circuit breakers thereby establishing a bus differential protection scheme utilizing two bus differential relays, one relay for each of only two of the three available phases for each of the plurality of switchgear. Each bus differential relay includes a processor responsive to computer executable code when executed thereon to provide a relay trip output signal to each of the plurality of switchgear in response to the bus differential protection scheme of the respective switchgear indicating an imbalanced three-phase current distribution thereat indicative of an arc-flash condition.

These and other advantages and features will be more readily understood from the following detailed description of preferred embodiments of the invention that is provided in connection with the accompanying drawings.

BRIEF DESCRIPTION OF THE DRAWINGS

Referring now to the drawings, which are meant to be exemplary and not limiting, and wherein like elements are numbered alike in the accompanying Figures.

DETAILED DESCRIPTION OF THE INVENTION

An embodiment of the invention, as shown and described by the various figures and accompanying text, provides a solution to an arc-flash hazard (AFH) problem by installing microprocessor-based (μP) bus differential protection on medium-voltage switchgear. In addition to providing a low-impedance bus differential protection, the μP relays provide analog and digital communications for operator monitoring and control via a Power Plant Distribution Control System (DCS).

The low-impedance bus differential protection scheme utilizes existing current transformers (CTs) that requires monitoring current on only two of the three available phases of the three-phase distribution system. The bus differential relay provides fast fault clearing to reduce the AFH condition and also detects other conditions outside the bus differential zone that could provide useful information regarding switchgear breaker performance. Using the μP bus differential relay's math functionality, current data from each feeder and source position is combinable with bus voltage data, which is also monitored by the relay, to provide real-time real and reactive power flow information.

In view of the complexity of electrical distribution systems and the interconnection of associated switchgear and control components, it is understood that one skilled in the art is a person having knowledge of prior art electrical distribution systems, switchgear and control components, and therefore details of such devices and architectures are not presented herein.

For a more thorough understanding of embodiments of the invention, a discussion will first be presented regarding the environment associated with the invention disclosed herein. A more complete discussion regarding this environment can be found in IEEE paper submission entitled "Upgrading Power System Protection to Improve Safety, Monitoring, Protection, and Control" by Jeff Hill and Ken Behrendt (copyright 2008, 20080110, TP6305-01, pp 1-11), herein incorporated by reference in its entirety.

In an exemplary processing plant, such as but not limited to a paper mill, which is a large consumer of electricity having 80 MegaWatts of load, five steam turbine generators (four operating at 15 kV and one at 5 kV) are utilized to supply this load while supplying process steam to paper processing machines. Each bus associated with each 15 kV generator is connected to a synchronizing bus through a current-limiting reactor. The synchronizing bus also serves as the local utility's connection to the plant.

Figure 1:
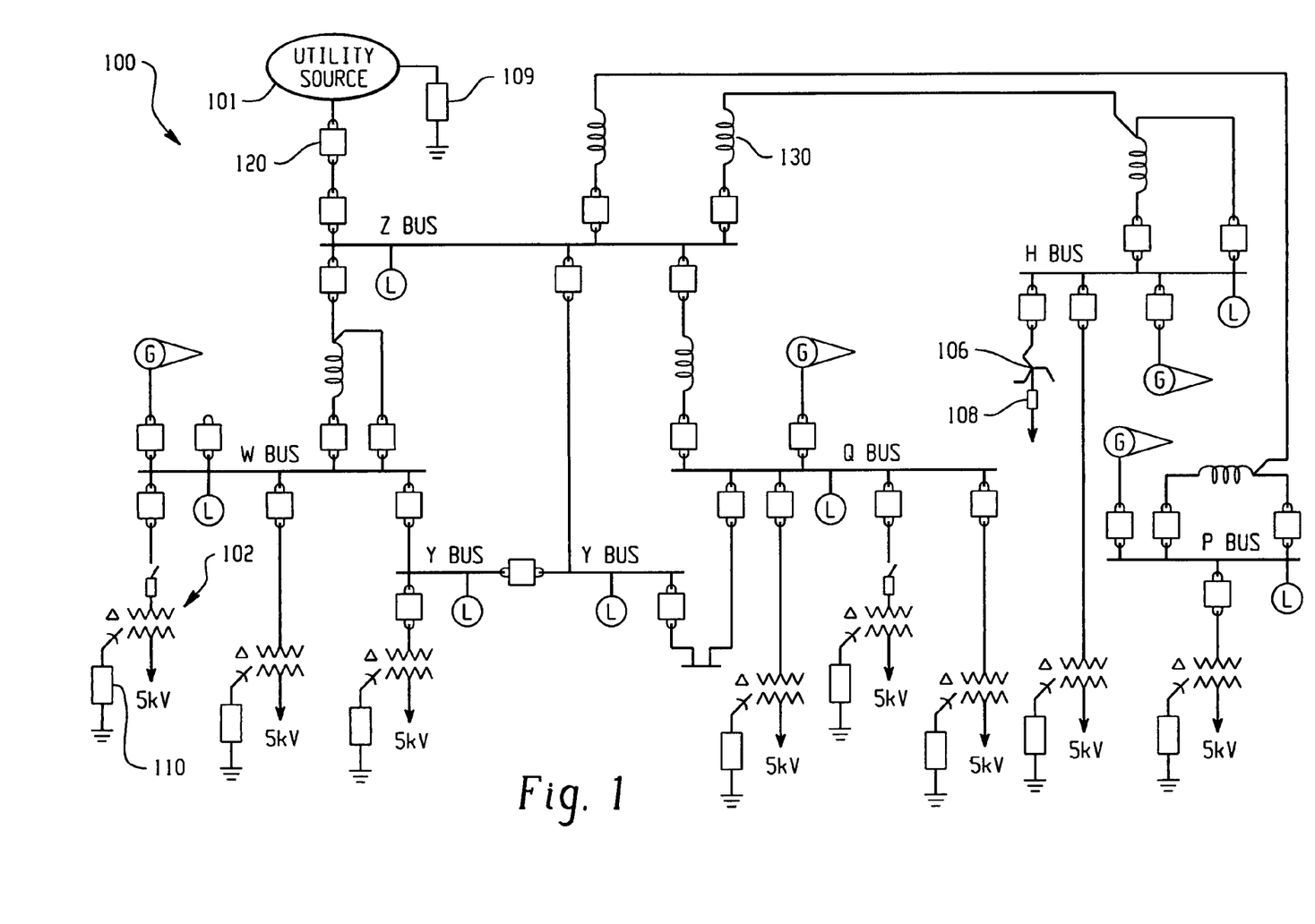
FIG. 1 depicts in one-line diagram form an electrical distribution system for use in accordance with an embodiment of the invention.
Figure 2:
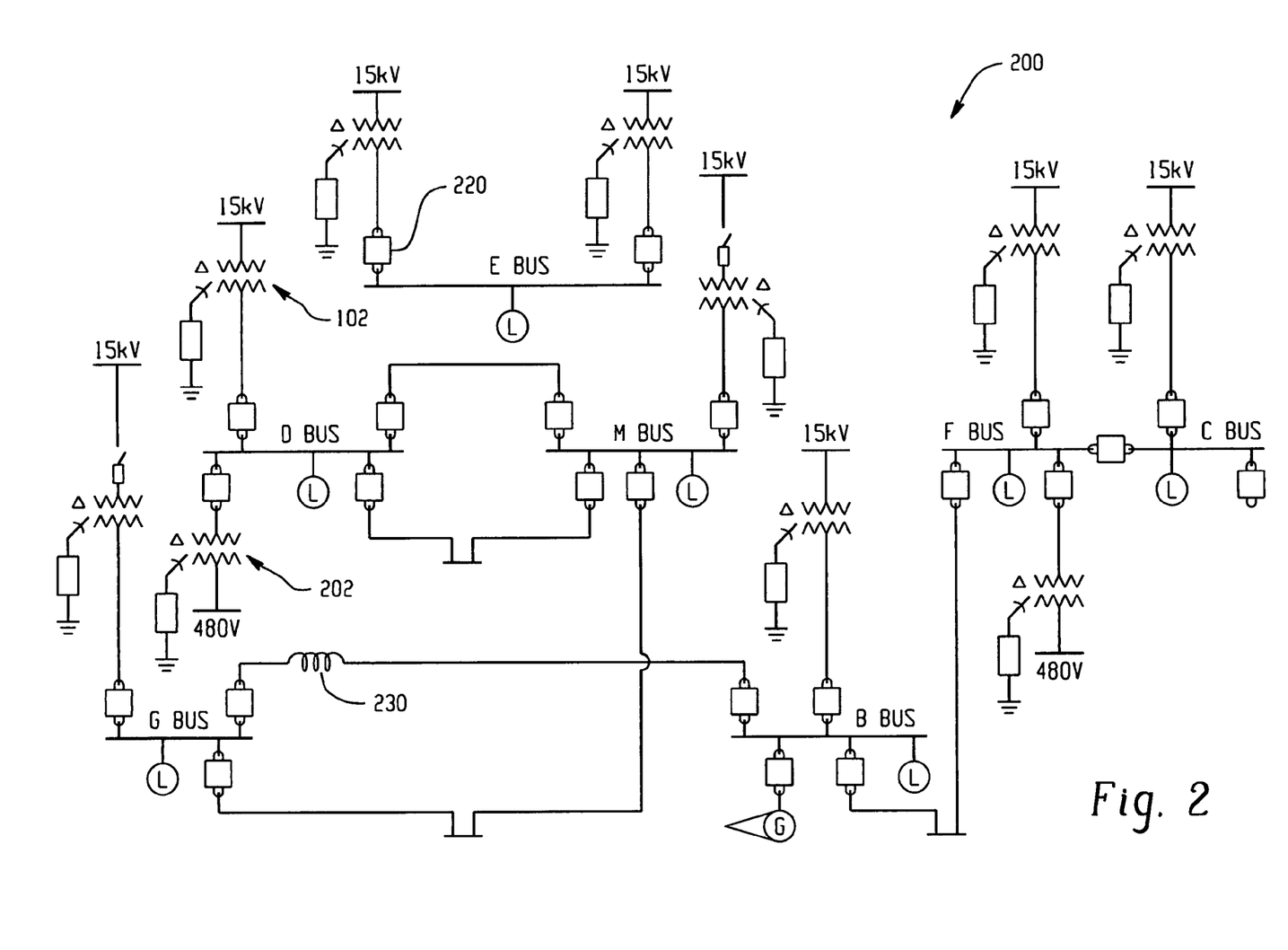
FIG. 2 depicts in one-line diagram form another electrical distribution system for use in accordance with an embodiment of the invention.

In the embodiment disclosed herein, the processing plant electrical distribution system consists of seven 15 kV buses, seven 5 kV buses, and numerous 480 V buses. The 15 kV and 5 kV system one-line diagrams are shown in FIGS. 1 and 2, respectively. Each 5 kV bus in the processing plant is supplied from two 15 kV buses. In this embodiment, all paper mill and converting loads are supplied from either the 15 kV or 5 kV power plant buses.

The generator neutral points are not grounded. Instead, a 15 kV zigzag grounding transformer is used on one of the generator buses, which is configured to establish a low-impedance ground source that limits single-line-to-ground faults to 400 A. A utility source transformer 101 and each of the 5 kV bus source transformers are also low-impedance grounded with 400 A resistors 109, 110, respectively.

Most 480 V unit substation transformers throughout the mill are high-impedance grounded with 10 A resistors.

Following release of the 2004 edition of NFPA-70E, an AFH study was performed that included more than 1,000 buses, encompassing the utility's 138 kV system down to most of the 480 V MCCs (motor control centers) and fused distribution panels of the processing plant. The available three-phase fault current levels at the 15 kV, 5 kV, and 480 V buses, respectively, were found to be 40 kA, 20 kA, and 50 kA RMS symmetrical. With this level of fault current and the then-existing plant protective relay settings (that is, prior to implementation of the invention disclosed herein), the calculated incident energies (IE) in cal/cm at the 15 kV buses were found to be greater than 1,000. An IE of 40 or less is a desired threshold level.

As a result of the AFH study, it was found that a majority of the AFH issues could be greatly mitigated through improved protection provided by the installation of microprocessor-based (µP) bus differential relays, as disclosed herein. In addition, significant benefits to improve monitoring and control were also realized because of the installation of the UP devices. The above-note IEEE paper submission provides detailed descriptions of the operating characteristics of µP relays.

At the 5 kV and 15 kV levels, low-impedance bus differential relays are used to provide AFH mitigation through rapid detection and interruption of bus fault current for all 5 kV and 15 kV buses of the processing plant.

A selected low-impedance bus differential relay operates on a per-phase basis, with all the circuit breaker current transformers (CTs) from a single phase creating a single-phase bus differential protection zone. Generally, CTs are installed on each phase of all circuit breakers, so three bus differential zones are established, one for each phase. Individual bus differential zones on each phase permit detection of all fault types, single-phase-to-ground involving any phase, all combinations of phase-to-phase faults, and three-phase faults.

However, in power distribution systems where the installed circuit breakers have only two phase CTs instead of the customary three phase CTs, such as in the exemplary processing plant, a unique challenge is presented. Having only two phase CTs results in a bus differential zone being created for only two out of the three available phases, which is not an issue for embodiments of the invention since single-phase-to-ground fault current magnitudes are limited by 400-Amp neutral-connected resistors on each ground source, thereby minimizing AFH for these faults, and resulting in high-speed tripping being required for AFH mitigation only for multiphase faults. As such, embodiments of the invention use bus differential zones established for Phases A and C, which are the two phases having CTs. The two bus differential zones provide sufficient coverage to detect all combinations of phase-to-phase faults, three-phase faults, and Phase A and Phase C single-phase-to-ground faults. In view of the foregoing, it will be appreciated that the two bus differential zones are not limited to just Phases A and C, but may be any two of the three phases where the CTs are placed.

An exemplary bus differential relay is SEL-487B available from Schweitzer Engineering Laboratories, Inc. that can support up to eighteen CTs, which means that any bus with nine or fewer breakers would require only one relay with two defined zones, that is, Phase A and Phase C. For buses with more than nine breakers, two separate differential relays may be used, one relay for Phase A zones and the other for Phase C zones.

In addition to bus differential relays providing AFH protection, these relays also provide automation and control functionality. The bus differential relay is naturally suited to measure current on each of the circuit breakers associated with the bus because of its CT connections. Each bus differential relay has automation registers and protection registers that can be freely programmed to fit any automation and control strategy.

The selected bus differential relay noted above includes voltage inputs, providing it with the ability to combine voltage and current measurements to make directional MW (Mega Watt) and MVAR (Mega Volt-Ampere Reactive) measurements. Directional metering information is also desirable in the process plant, where many buses are supplied from two or more sources. In the exemplary processing plant, all but one of the buses includes phase-to-phase connected PTs in a conventional open-delta configuration. The other bus PTs are connected in a wye. Use of only two CTs per breaker means that computations are required to calculate full three-phase MW and MVAR measurements from two currents and two voltages. The selected bus differential relay SEL-487B met the task because it offers 1,000 user-defined automation math variables and a variety of math operators, as shown in Table I.

TABLE I

OPERATORS AVAILABLE FOR MATH CONTROL EQUATIONS

| Operator | Description |
| --- | --- |
| ( ) | Parentheses |
| +, −, *, / | Arithmetic |
| SQRT | Square root |
| LN, EXP, LOG | Natural logarithm, exponentiation of e, base 10 logarithm |
| COS, SIN, ACOS, ASIN | Cosine, sine, arc cosine, arc sine |
| ABS | Absolute value |
| CEIL | Rounds to the nearest integer towards infinity |
| FLOOR | Rounds to the nearest integer towards minus infinity |
| — | Negation |

Figure 3A:
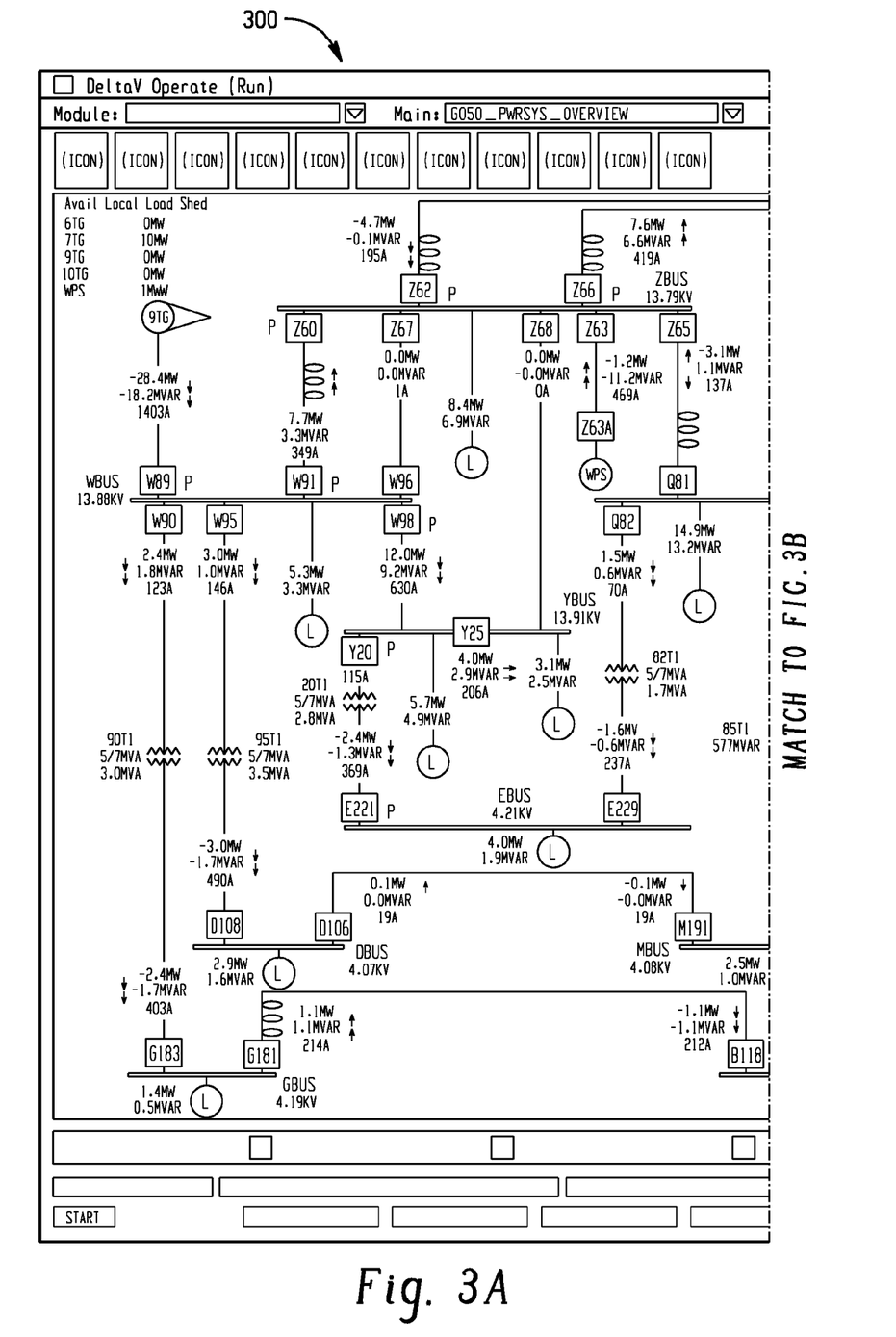
FIGS. 3A, 3B, 4A, 4B, 5A and 5B depict artistic renditions of screen shots of Human Machine Interface (HMI) monitoring and control screens for use in accordance with embodiments of the invention.
Figure 3B:
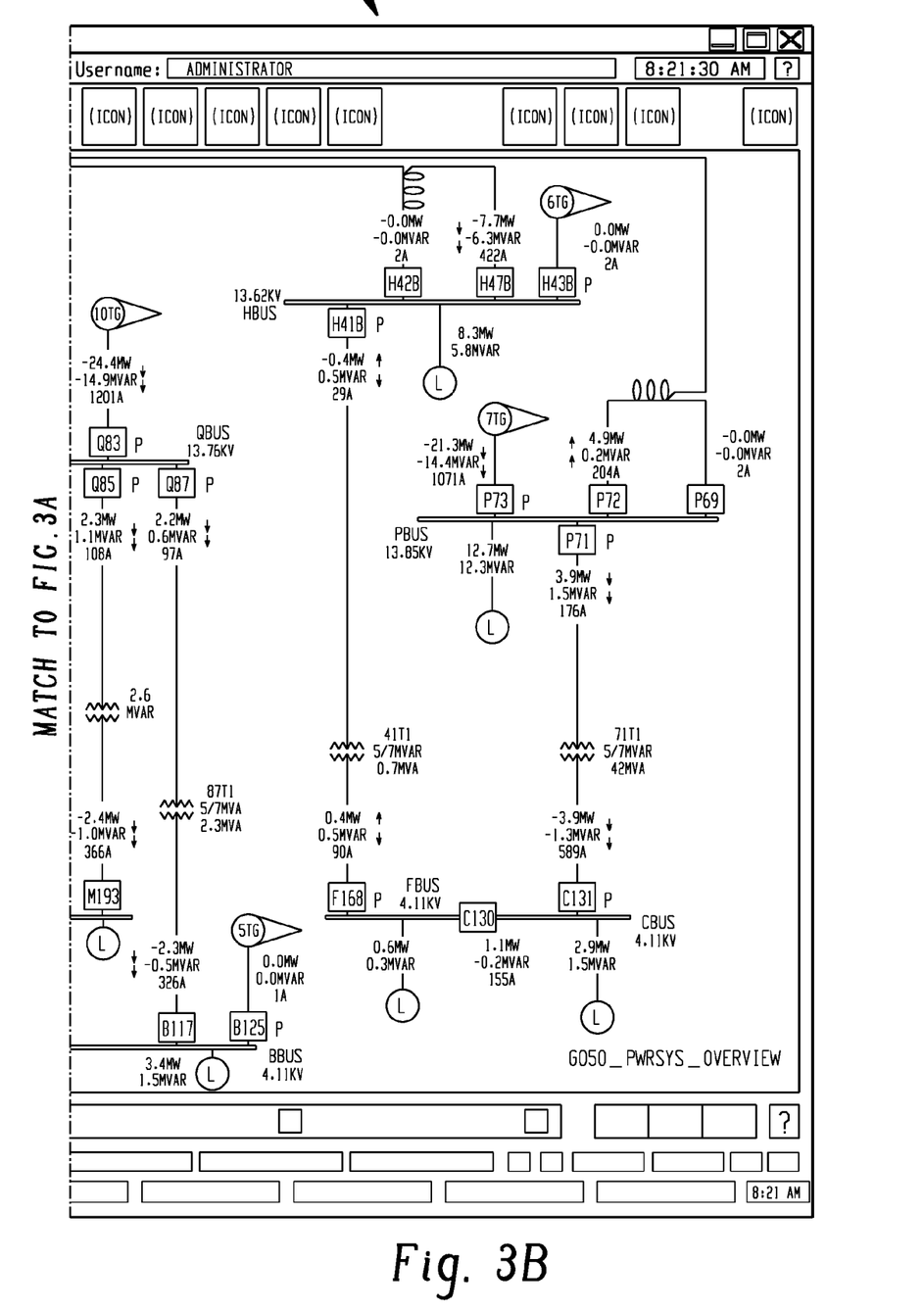
Figure 4A:
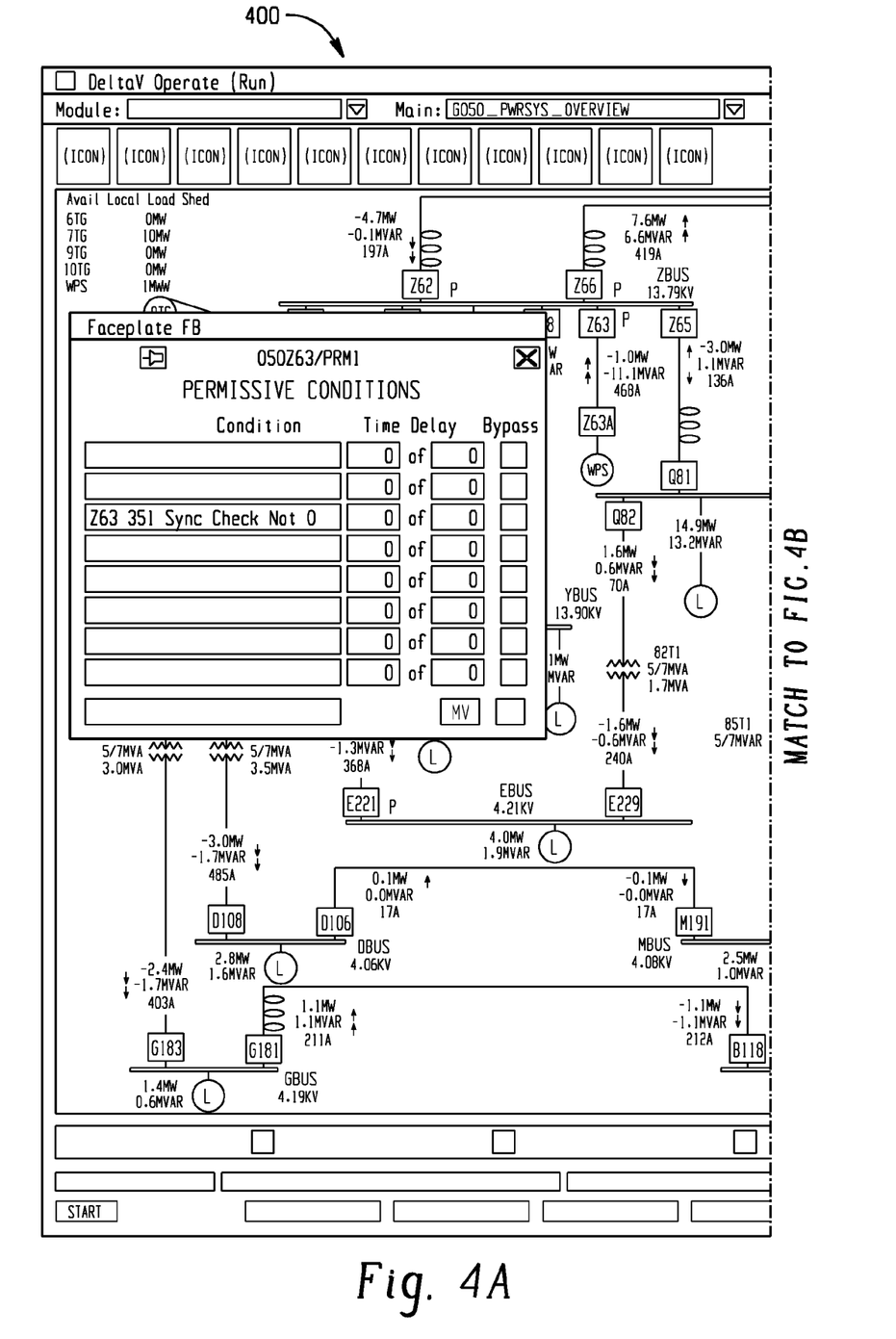
Figure 4B:
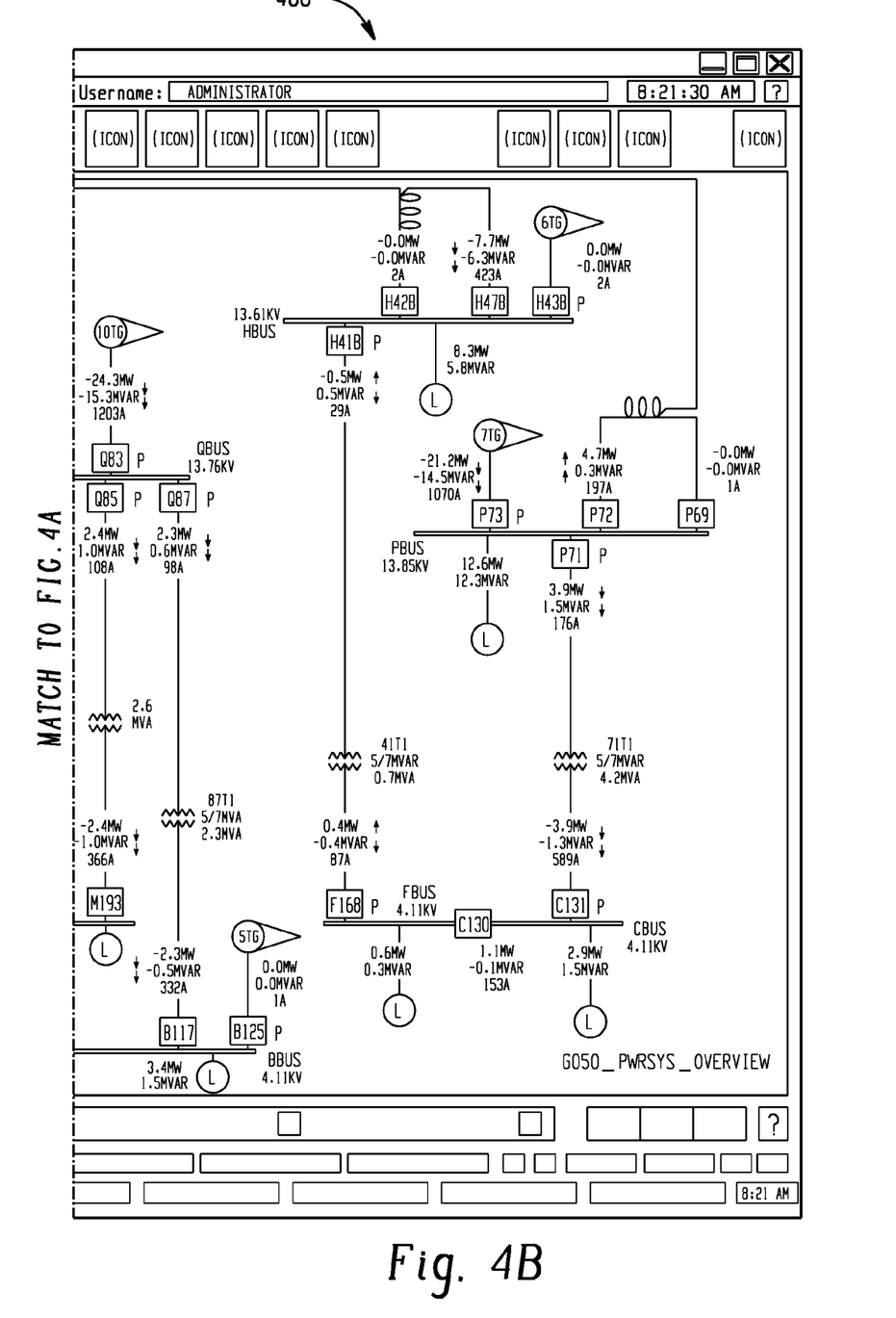
Figure 5A:
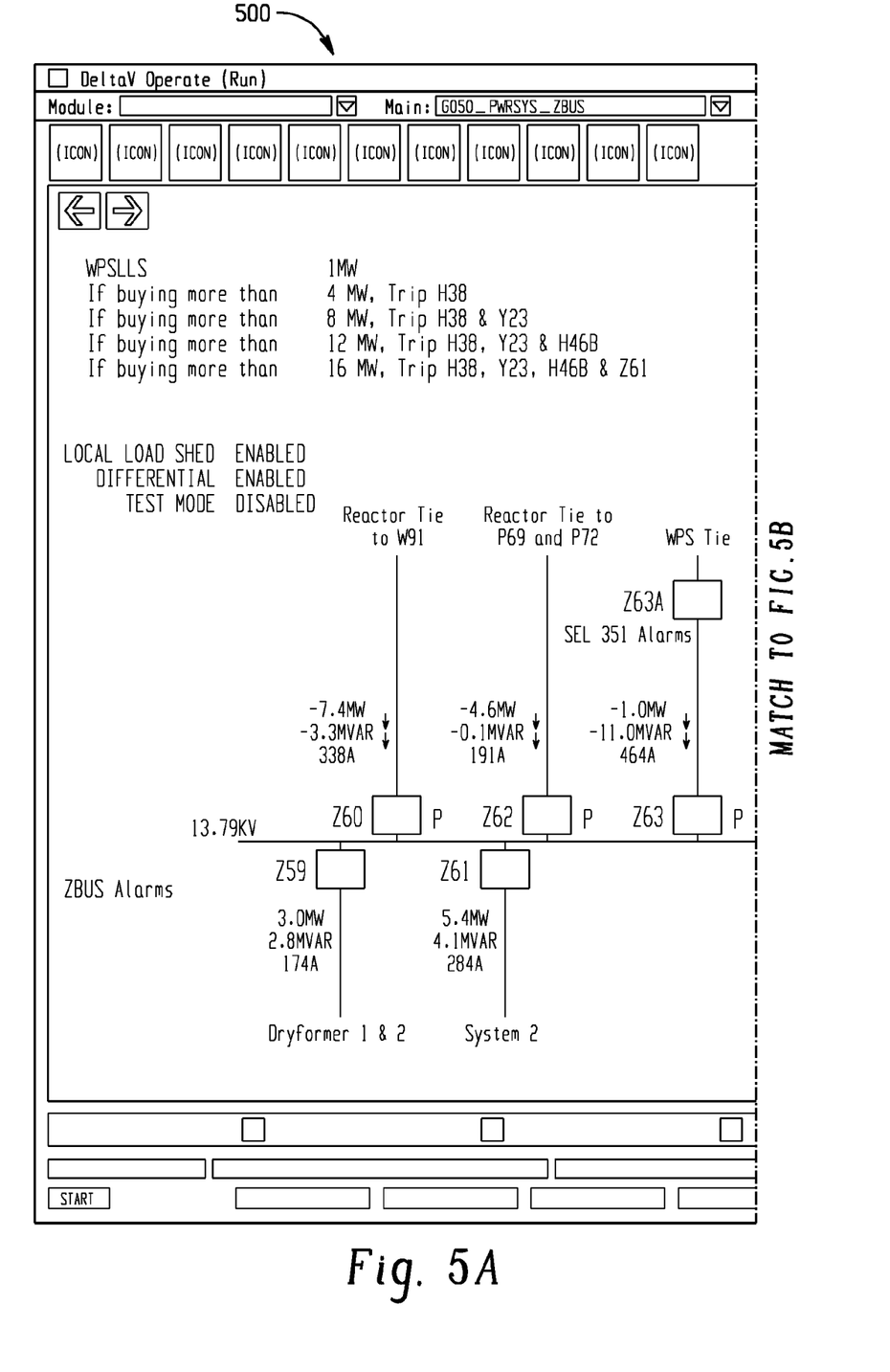
Figure 5B:
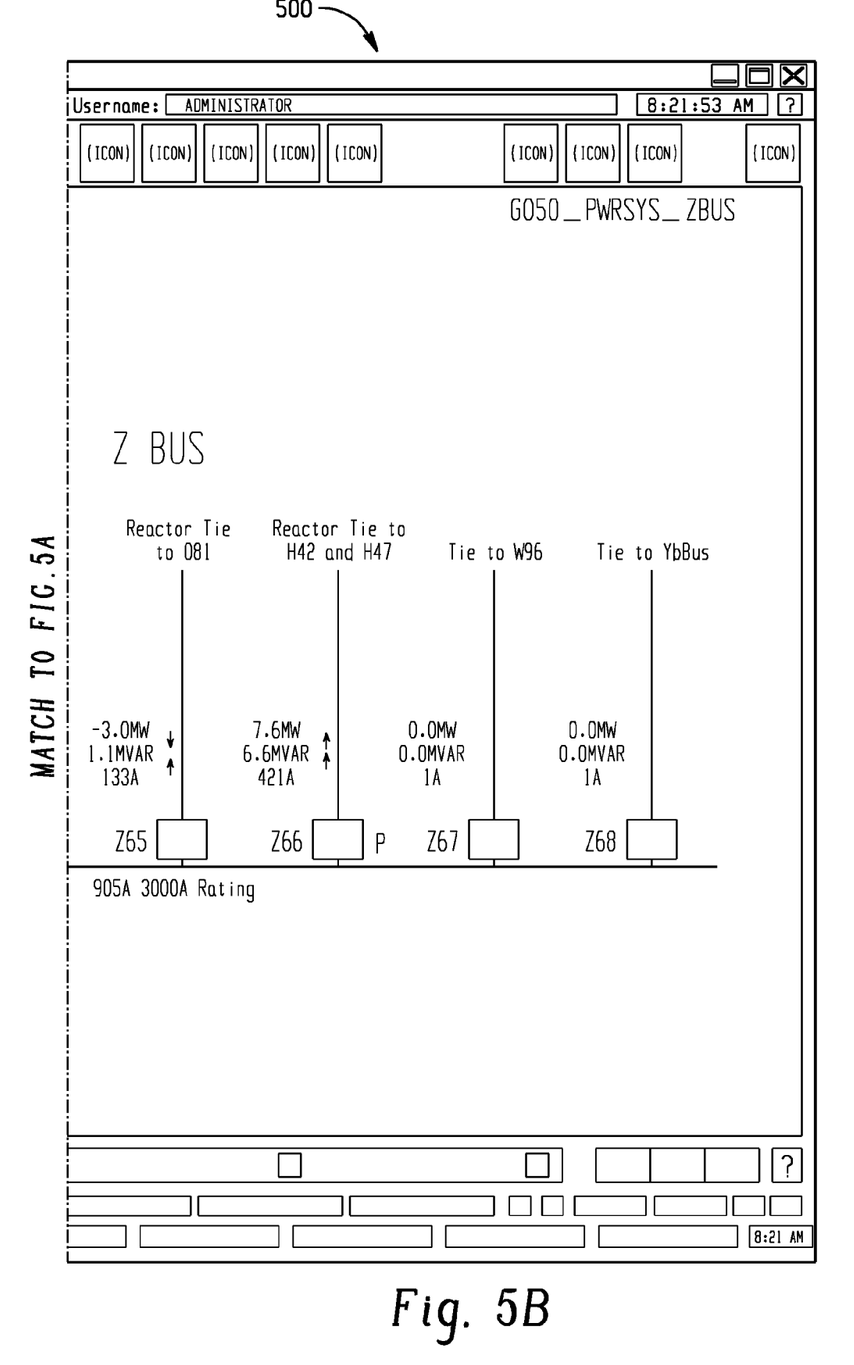

The calculated analog data in the bus differential relays are passed to the processing plant control room human-machine interface (HMI) via three communications processors that gather and consolidate the relay data. These communications are by a fast binary protocol operating over serial connections. The communications processors and the upstream HMI are all interconnected via Ethernet, which, among other benefits, makes it possible to log into a communications processor or an individual relay over existing network connections. In an embodiment, the HMI consists of two 46-inch LCD (Liquid Crystal Display) monitors displaying the mill system one-line diagrams. Analog data are presented for each breaker. See FIGS. 3A, 3B, 4A, 4B, 5A and 5B for typical HMI screens 300, 400 and 500, respectively, where FIGS. 3A and B depict an HMI screen for a 15 kV system, FIGS. 4A and B depict an HMI screen for a 15 kV system with informational breaker popup window, and FIGS. 5A and B depict an HMI screen for an individual 15 kV system bus.

Protection equations implemented in the bus differential relays permit remote OPEN/CLOSE commands to be received and processed from the control room HMI. Each breaker open/close status is displayed on the HMI as well as permissive interlock lists that help operators determine why a breaker might not close. Remote breaker operation is highly desirable so that operations personnel do not have to stand in front of a breaker to operate it.

Figure 6:
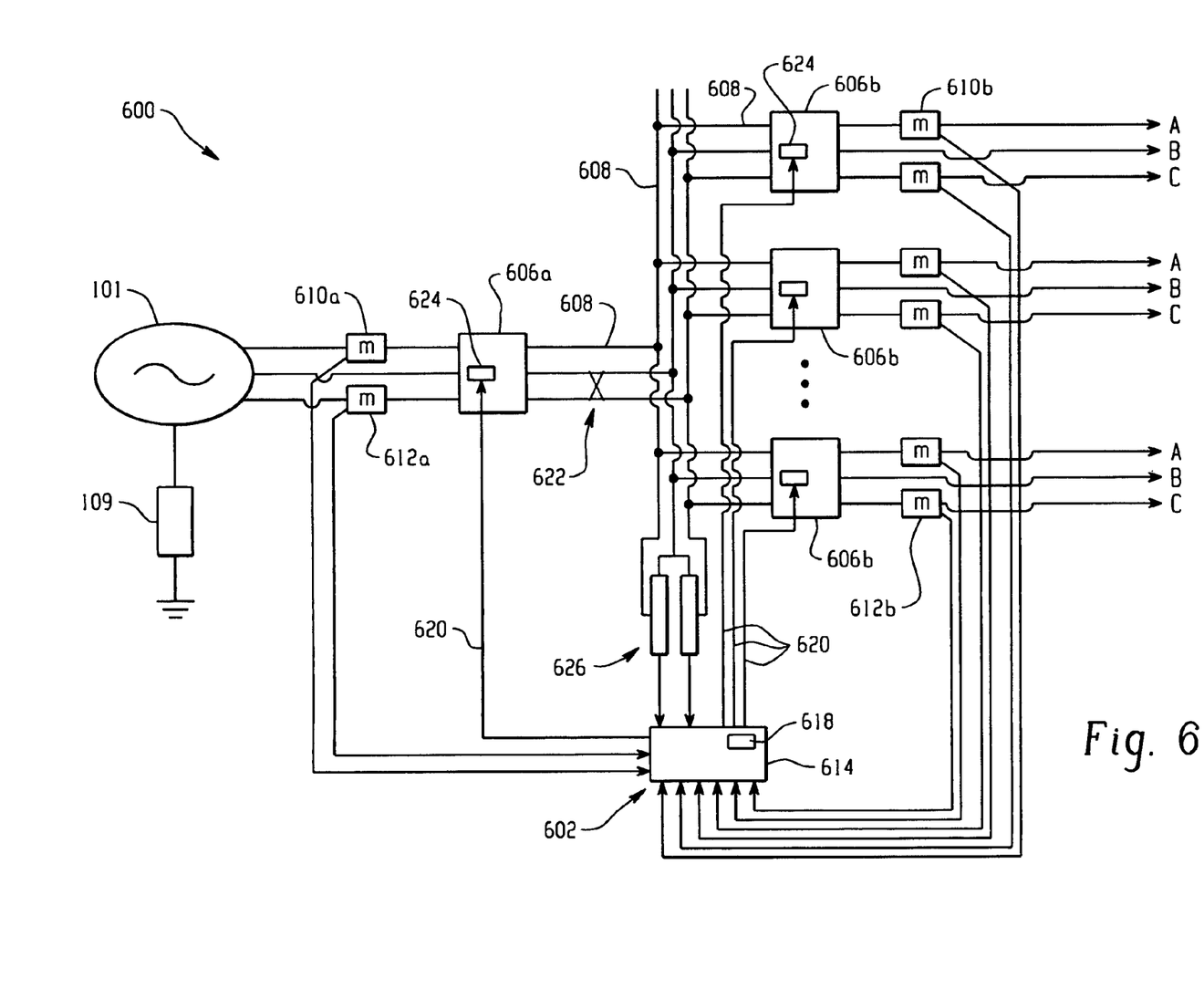
FIG. 6 depicts in three-line diagram form an electrical distribution system in accordance with an embodiment of the invention.

Turning now to FIG. 6, a three-phase electrical distribution system 600 having phases A, B and C for different load circuits is depicted having an arc-flash hazard protection system 602 in accordance with an embodiment of the invention. The electrical distribution system 600 includes a plurality of switchgear 606 interconnected with a plurality of distribution buses 608. As used herein, similar base reference numerals in the various figures are representative of a similar type apparatus, and appended lowercase letters are representative of the relative position of one such apparatus to another. Where reference is made herein to only the base reference numeral, such reference is directing discussion to all such similar apparatus regardless of their relative position. For example, reference to 606 is directing discussion to the apparatus of 606a and 606b.

The AFH protection system 602 includes a plurality of first and second current transformers (CTs) 610, 612 in signal communication with respective first and second phases A and C of each of the plurality of switchgear 606, and a bus differential relay 614 connected to receive output signals from each of the first and second current transformers of each of the plurality of switchgear to establish a bus differential protection scheme utilizing only two of the three available phases for each of the plurality of switchgear. As can be seen in the embodiment of FIG. 6, the relative positions of CTs 610, 612 is such that CTs 610a and 612a are on one side of switchgear 606a, and CTs 610b and 612b are on the opposing side of switchgear 606b, thereby establishing a protection scheme in the zone between the "a" and "b" CTs, which will be discussed further below. However, the scope of the invention is not limited to the CTs being outboard of switchgear as illustrated in FIG. 6, but also encompasses an arrangement where the CTs are inboard of the switchgear. The outboard CT arrangement established a protection zone between the CTs that includes the switchgear, while the inboard CT arrangement establishes a protection zone between the CTs that does not include the switchgear.

The bus differential relay 614 comprises a processor 618 responsive to computer executable code when executed thereon to provide a relay trip output signal 620 to a trip unit 624 at each of the plurality of switchgear 606 in response to the bus differential protection scheme of the respective switchgear indicating an imbalanced three-phase current distribution indicative of an internal arc-flash condition 622. As used herein, an internal arc-flash condition is descriptive of an arc-flash condition that is internal to the protection zone defined by the location of all of the CTs connected to the bus differential relay 614.

From the foregoing, it will be appreciated that upon detection of an internal arc-flash condition, all circuit breakers (switchgear 606) connected to the bus differential relay 614 will trip upon receipt of the relay trip output signal 620.

As illustrated in FIGS. 1 and 2, an embodiment of the invention is implemented with an electrical distribution system 100, 200 (depicted in FIG. 6 by reference numeral 600) being a medium voltage electrical distribution system that operates at a bus voltage equal to or greater than 1 kVAC, such as 15 kV and 5 kV for example, having switchgear that operates on a first of the plurality of distribution buses (H, P, Q, W, two Y's and Z) with a rated operating voltage of 15 kVAC (FIG. 1), and switchgear that operates on a second of the plurality of distribution buses (B, C, D, E, F, G and M) with a rated operating voltage of 5 kVAC (FIG. 2). Stepdown transformers 102, 202 step the 15 kV level down to 5 kV, and the 5 kV level down to 480V, respectively. Recitation herein of medium voltage levels 15 kV and 5 kV is for discussion purposes only, and should not be considered limiting in anyway. As such, recitation of a first medium voltage level and a second medium voltage level is equally applicable to the disclosed invention, where the first medium voltage level is greater than the second medium voltage level.

In FIGS. 1 and 2, the "circle-G" symbol is representative of a power source such as a mill steam generator for example, the "circle-L" symbol is representative of a grouped load such as various machinery in a mill for example, the rectangular box graphics 120, 220 are representative of circuit breakers such a drawout circuit breakers and switchgear 606 for example, and the "inductor" symbols 130, 230 are representative of a current limiting reactor.

All 15 kV buses in an embodiment utilize a zigzag grounding transformer 106 which establishes a low-impedance ground connection through a limiting resistor 108 that limits 15 kV single-line-to-ground faults to a defined ampere threshold, such as 400 Amps for example.

In an embodiment, all 5 kV stepdown transformers 102 have a neutral point grounded with a low-impedance ground connection through the 400 Amp resistor 110 that limits 5 kV line-to-ground faults to a defined ampere threshold, such as 400 Amps for example.

In view of the foregoing, it will be appreciated that the bus differential relay 614 is responsive to a phase-to-phase or three-phase arc flash condition to cause tripping of the switchgear 606 associated with and in signal communication with the bus differential relay 614, and wherein the low-impedance ground connection, through either the 5 kV neutral ground resistor 110 or the 15 kV zigzag ground resistor 108, grounds potential phase-to-ground arc flash conditions.

As discussed above, an exemplary bus differential relay 614 is SEL-487B available from Schweitzer Engineering Laboratories, Inc. that can support up to eighteen CTs, which means that any bus with nine or fewer breakers or switchgear units would require only one relay with two defined zones, that is, Phase A and Phase C, thereby establishing a two zone bus differential scheme for up to nine circuit breakers that is supported by only one bus differential relay 614.

In an embodiment, and in addition to the foregoing CT connections, A-B phase and B-C phase potential transformers 626 (see FIG. 6) are employed on a distribution bus common to the plurality of switchgear 606, with their respective voltage outputs being connected to the bus differential relay 614, thereby enabling the processor 618 of the bus differential relay 614 to be further responsive to computer executable code when executed thereon to provide real-time power flow information calculated from the current transformer signal outputs and the potential transformer voltage outputs.

Figure 7:
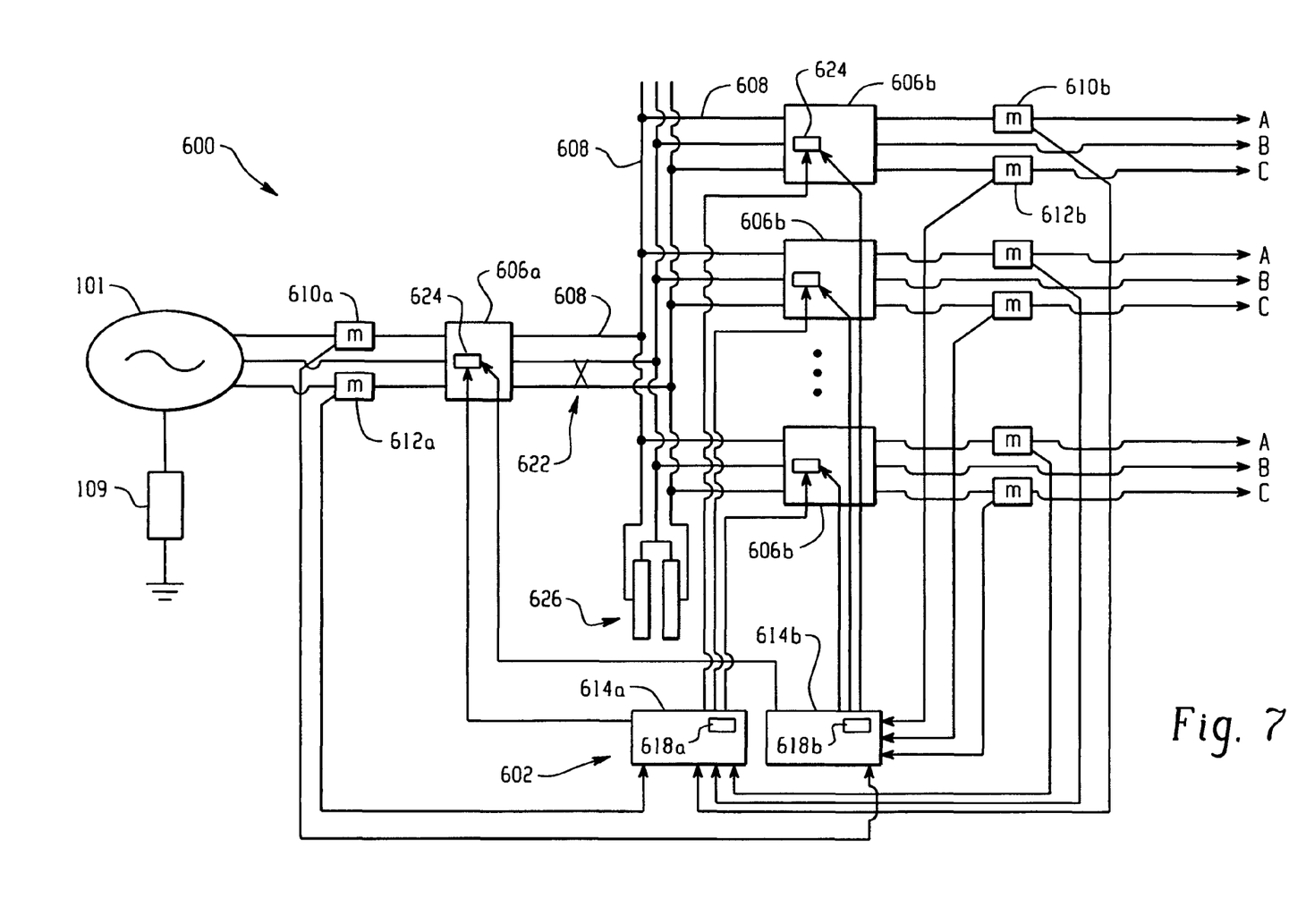
FIG. 7 depicts in three-line diagram form an alternative electrical distribution system to that of FIG. 6 and in accordance with an embodiment of the invention.

As also discussed above for buses with more than nine breakers and up to eighteen breakers, two separate differential relays may be used, with a first bus differential relay being used for Phase A zones and a second bus differential relay being used for Phase C zones. Such an arrangement is depicted in FIG. 7, with first and second relays being designated 614a and 614b. For clarity, FIG. 7 does not include the connections between PTs 626 and relays 614a and 614b, but such an arrangement will be appreciated by comparing FIGS. 6 and 7 along with the foregoing discussion of PTs 626.

While certain combinations of devices relating to the disclosed electrical distribution system have been described herein, it will be appreciated that these certain combinations are for illustration purposes only and that any combination of any of these devices may be employed, explicitly or equivalently, either individually or in combination with any other of the devices disclosed herein, in any combination, with appropriate connections and interdependent components being present, and all in accordance with an embodiment of the invention. Any and all such combinations are contemplated herein and are considered within the scope of the invention disclosed.

An embodiment of the invention may be embodied in the form of computer-implemented processes and apparatuses for practicing those processes. Embodiments of the invention may also be embodied in the form of a computer program product having computer program code containing instructions embodied in tangible media, such as floppy diskettes, CD-ROMs, hard drives, USB (universal serial bus) drives, or any other computer readable storage medium, such as read-only memory (ROM), random access memory (RAM), and erasable-programmable read only memory (EPROM), for example, wherein, when the computer program code is loaded into and executed by a computer, the computer becomes an apparatus for practicing embodiments of the invention. Embodiments of the invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the invention. When implemented on a general-purpose microprocessor, the computer program code segments configure the microprocessor to create specific logic circuits. A technical effect of the executable instructions is to provide AFH protection using phase CTs in only two of the three available phases of a three-phase electrical distribution system.

While various embodiments of the invention have been disclosed and illustrated using the several figures as representative schematic diagrams of an electrical distribution system operating at 15 kV, 5 kV and 480 V, it will be appreciated that these diagrams are for illustration purposes only, and that the scope of the invention extends to any other electrical distribution system falling within the ambit of the claimed invention.

Performance of the disclosed invention will now be described in view of the foregoing discussion and with particular attention being paid to FIG. 6. In an embodiment where switchgear 606a is a main source circuit breaker, and all switchgear 606b are branch feeder circuit breakers, the A-phase current sensed by the "main" 610a CT should be equal to the sum of the A-phase currents sensed by all "branch" 610b CTs. If not zero, then the bus differential relay 614 will declare such an imbalance as an internal fault in the zone between the CTs. The same applies to the C-phase CTs.

In a more general sense, one or more of the switchgear 606b may also be a source of current to the bus 608 in addition to the "main" switchgear 606a. The bus differential relay 614 sums all of the A-phase currents, and if the sum is zero determines that either there is no fault or the fault is outside of the monitored zone encompassed by the A-phase CTs. If the sum is not zero the relay declares an internal fault and then energizes relay trip output signals 620 that trips all of the switchgear 606a and 606b on the bus 608. The same applies to the C-phase CTs.

As disclosed, some embodiments of the invention may include some of the following advantages: AFH protection utilizing only two CTs per three-phase distribution circuit; remote breaker operation in combination with AFH protection; monitoring and metering functionality in combination with AFH protection; and, local load shedding functionality in combination with AFH protection.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An arc-flash hazard protection system for a three-phase electrical distribution system comprising a plurality of switchgear interconnected with a plurality of distribution buses, the protection system comprising:
   a plurality of first and second current transformers in signal communication with respective first and second phases of each of the plurality of switchgear; and
   a bus differential relay connected to receive output signals from each of the first and second current transformers of each of the plurality of switchgear to establish a bus differential protection scheme utilizing only two of the three available phases for each of the plurality of switchgear;
   wherein the bus differential relay comprises a processor responsive to computer executable code when executed thereon to provide a relay trip output signal to each of the plurality of switchgear in response to the bus differential protection scheme of the respective switchgear indicating an imbalanced three-phase current distribution threat indicative of an arc-flash condition.

2. The protection system of claim 1, wherein the electrical distribution system is a medium voltage electrical distribution system.

3. The protection system of claim 2, wherein the medium voltage electrical distribution system operates at a bus voltage equal to or greater than 1 kVAC.

4. The protection system of claim 1, wherein the plurality of switchgear is equal to or less than nine circuit breakers, that is, up to nine circuit breakers, and the bus differential relay is connected to receive up to eighteen current transformer output signals from the up to nine circuit breakers, thereby establishing a two zone bus differential scheme for up to nine circuit breakers that is supported by only one of the bus differential relay.

5. The protection system of claim 1, wherein the plurality of switchgear operating on the plurality of distribution buses have a rated operating voltage of 15 kVAC or 5 kVAC.

6. The protection system of claim 1, wherein the plurality of distribution buses have a 5 kV operational voltage rating, and further comprising:
   a transformer rated and disposed to service an associated portion of the plurality of distribution buses, the transformer having a neutral point grounded with a low-impedance ground connection that limits a 5 kV line-to-ground fault to a defined ampere threshold.

7. The protection system of claim 6, wherein the bus transformer has a 5 kVAC operational voltage rating, and the low-impedance ground connection is a 400 Amp resistor.

8. The protection system of claim 1, wherein the plurality of distribution buses have a 15 kV operational voltage rating, and further comprising a zigzag grounding transformer that establishes a low-impedance ground connection that limits 15 kV single-line-to-ground faults to a defined ampere threshold.

9. The protection system of claim 8, wherein the zigzag grounding transformer has a 15 kV operational voltage rating that establishes the low-impedance ground connection through a limiting resistor, and the defined ampere threshold is 400 Amps.

10. The protection system of claim 1, further comprising:
    an A-B phase and a B-C phase potential transformer disposed to provide phase-to-phase voltages common to each of the plurality of distribution buses;
    wherein the bus differential relay is connected to receive voltage outputs from each of the potential transformers;
    wherein the processor of the bus differential relay is further responsive to computer executable code when executed thereon to provide real-time power flow information calculated from the current transformer signal outputs and the potential transformer voltage outputs.

11. The protection system of claim 1, wherein the bus differential relay is responsive to a phase-to-phase arc flash condition to cause tripping of each of the plurality of switchgear associated with the bus differential relay.

12. The protection system of claim 11, further comprising a low-impedance ground connection, through either a 5 kV neutral ground resistor or a 15 kV zigzag ground transformer, that grounds potential phase-to-ground arc flash conditions.

13. An arc-flash hazard protection system for a three-phase electrical distribution system comprising a plurality of switchgear interconnected with a plurality of distribution buses, the protection system comprising:
    a plurality of first and second current transformers in signal communication with respective first and second phases of each of the plurality of switchgear;
    a first bus differential relay connected to receive output signals from each of the first current transformers of each of the plurality of switchgear;
    a second bus differential relay connected to receive output signals from each of the second current transformers of each of the plurality of switchgear;
    wherein the plurality of switchgear is equal to or less than eighteen circuit breakers, that is, up to eighteen circuit breakers, and each bus differential relay is connected to receive up to eighteen current transformer output signals from the up to eighteen circuit breakers thereby establishing a bus differential protection scheme utilizing two bus differential relays, one relay for each of only two of the three available phases for each of the plurality of switchgear;
    wherein each bus differential relay comprises a processor responsive to computer executable code when executed thereon to provide a relay trip output signal to each of the plurality of switchgear in response to the bus differential protection scheme of the respective switchgear indicating an imbalanced three-phase current distribution threat indicative of an arc-flash condition.

* * * * *